UNITED STATES PATENT OFFICE.

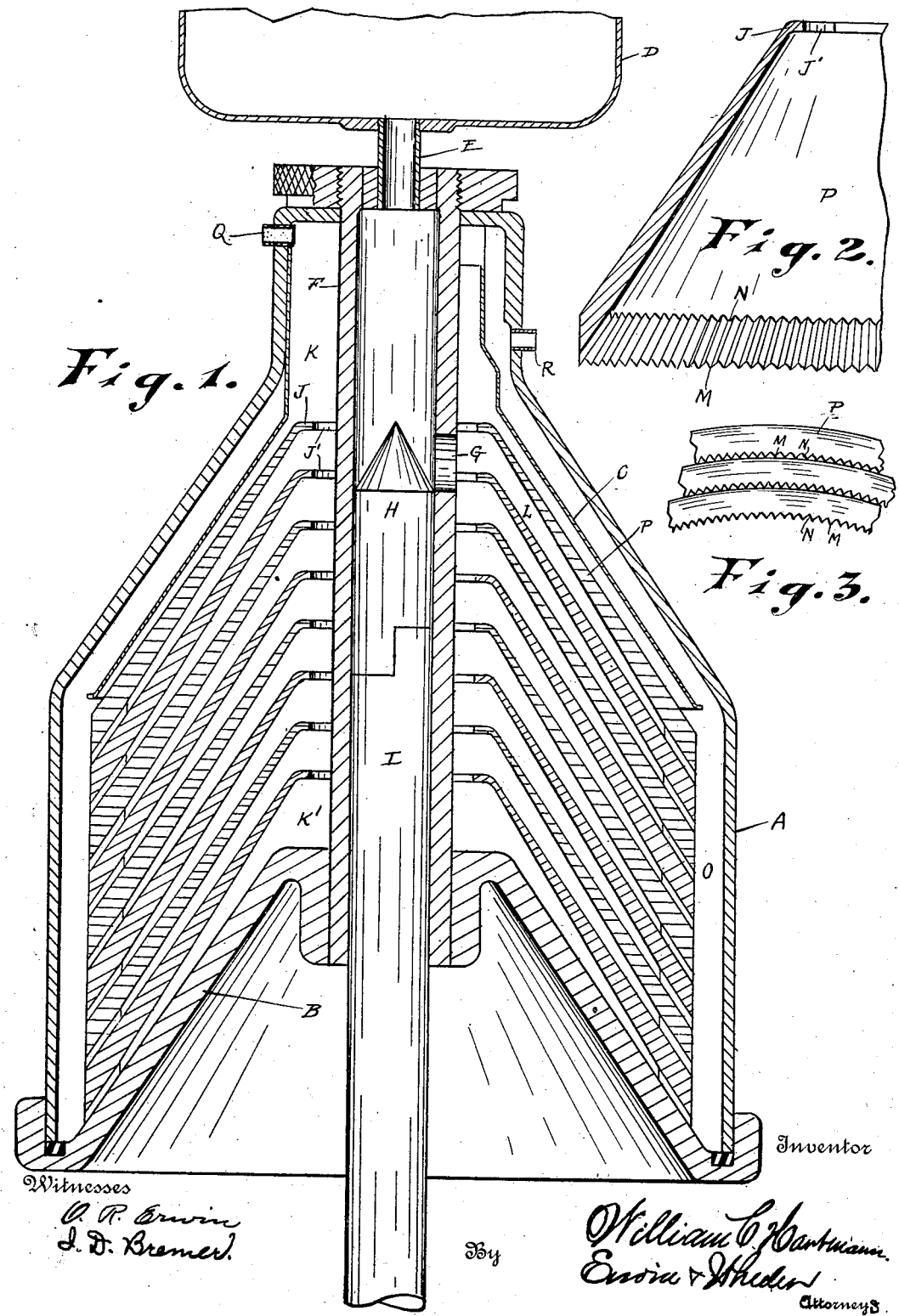

WILLIAM C. HARTMANN, OF MILWAUKEE, WISCONSIN, ASSIGNOR, BY DIRECT AND MESNE ASSIGNMENTS, TO THE MILWAUKEE SEPARATOR COMPANY, A CORPORATION OF WISCONSIN.

CREAM-SEPARATOR.

961,349.  Specification of Letters Patent.  Patented June 14, 1910.

Application filed September 20, 1909. Serial No. 518,548.

*To all whom it may concern:*

Be it known that I, WILLIAM C. HARTMANN, a citizen of the United States, residing at Milwaukee, county of Milwaukee, and State of Wisconsin, have invented new and useful Improvements in Cream-Separators, of which the following is a specification.

My invention relates to improvements in centrifugal cream separators.

The object of my invention is to provide means for more effectually separating the cream by preventing any lag in the fluid at the point of effective separation, the fluid being kept in rotation at this point at the same speed as that of the revolving cones.

My invention also has for its object certain improvements in structure hereinafter described and claimed.

In the following description, reference is had to the accompanying drawings, in which—

Figure 1 is a vertical sectional view of a separator embodying my improvements Fig. 2 is a detail view in vertical section of a portion of one of the cones. Fig. 3 is a detail view of a portion of the lower margins of three of the separating cones, showing their relation to each other.

Like parts are identified by the same reference characters throughout the several views.

An inclosing casing A is provided with a conical base B, an interior conical shield C and a feed reservoir D.

The feed reservoir D is adapted to deliver the unseparated milk through a duct E into a tubular spindle F, from which it is delivered to the separating cones through a port G. The spindle F is provided with a plug H rigidly secured therein immediately below the opening G, this plug being notched at $h$ to fit a corresponding notch in the driving shaft I. The construction is such that the casing, reservoir and tubular spindle F may be lifted vertically and removed from the shaft I at any time. When in position, however, the motion of the shaft I will be communicated to the spindle F, casing A and reservoir D, through the plug H, thereby causing all the parts to rotate.

A series of separating cones (truncated) are supported from the base B and from each other, being loosely placed in the casing upon said base. These cones are provided with horizontal upper end portions J, having openings J' communicating between the intervening spaces and with the spaces K and K' above and below the cones respectively. These cones have walls P, which increase in thickness downwardly and outwardly, thus providing conical spaces L, which decrease in width from points near the spindle F to the outer or lower margins of the cones, at which points the inner wall of each cone is abruptly thickened and grooved, knurled or serrated to provide a series of ribs M bearing upon the smooth surface of the next succeeding cone, with intervening channels N, the ribs and channels extending longitudinally along the inner surfaces of the respective cones, whereby said channels permit the milk to flow from the spaces L downwardly and outwardly to the space O between the lower margins of the cones and the wall of the casing A. It will be obvious that any milk traversing a channel N must necessarily receive the full speed of rotation at the cone margins instead of being permitted to lag as it would do if the surfaces were completely separated from each other or if the inner and outer walls of the cones were both smooth surfaced at these points. It is not essential to my invention whether the serrations are formed on the inner or outer walls of the respective cones, since the inner wall of one cone opposes the outer surface of the next, and serrations on either surface would provide the desired channels.

In operation, milk from the reservoir D flows downwardly through the duct E, tubular spindle F and aperture G to the spaces L between the cones and downwardly in such spaces, receiving motion from the cones, which motion increases with the distance of the fluid from the axis. The column of fluid passing downwardly in any one of the spaces L becomes increasingly thin as the speed of rotation increases and is finally separated into small streams flowing through the channels N, which streams are revolved at the same speed as that of the lower margins of the cones. The cream is thus effectually separated from the milk and is forced upwardly and inwardly to the spindle F and upwardly along said spindles through the openings J' into the cavity K within the shield C, from which cavity it is delivered through the port Q to the exterior of the casing. The milk from which the cream has been separated, passes downwardly through the channels N into the space O and upwardly in said space and along the exterior surface of the shield C to an outlet port R.

Having thus described my invention, what I claim as new, and desire to secure by Letters Patent, is—

1. In a cream separator, the combination with an inclosing case and a supply reservoir, of a series of separating cones between which fluid from said reservoir is adapted to flow, said cones being provided upon one side with a plain ungrooved surface and upon their opposite sides at their lower edges with a continuous series of radial grooves whereby when the several cones of the series are secured together, the smooth surface of one cone is brought in contact with the grooved surface of the next adjacent cone and whereby each groove of the series forms a separate independent channel by which the fluid is moved laterally with the cones as they revolve, while the lighter and heavier properties of the fluid are being separated.

2. In a cream separator, the combination with an inclosing casing and feed reservoir, of a series of separating cones arranged to receive fluid from said reservoir between them, said separating cones having walls progressively thickened outwardly and downwardly from the receiving point and provided with cream delivering apertures at their upper ends, the walls of said separating cones being arranged to closely approach each other at their outer and lower margins and provided upon one side only with a continuous series of grooves forming downwardly and outwardly extending channels adapted to carry the milk while they permit the flow of the heavier portion of the liquid from the space between the cones.

3. In a cream separator, the combination with an inclosing casing and feed reservoir, of a series of separating cones arranged to receive fluid from said reservoir between them, said separating cones having walls progressively thickened outwardly and downwardly from the receiving point and provided with cream delivering apertures at their upper ends, the walls of said separating cones being arranged to closely approach each other at their outer and lower margins and provided on their lower sides with a continuous series of grooves forming downwardly and outwardly extending channels adapted to carry the milk while they permit the flow of the heavier portion of the liquid from the space between the cones.

In testimony whereof I affix my signature in the presence of two witnesses.

WILLIAM C. HARTMANN.

Witnesses:
I. D. BREMER,
O. R. ERWIN.